United States Patent
Hara

(10) Patent No.: US 10,812,672 B2
(45) Date of Patent: Oct. 20, 2020

(54) IMAGE FORMING APPARATUS, METHOD FOR CONTROLLING THE SAME, AND STORAGE MEDIUM

(71) Applicant: CANON KABUSHIKI KAISHA, Tokyo (JP)

(72) Inventor: Kenji Hara, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/248,928

(22) Filed: Aug. 26, 2016

(65) Prior Publication Data

US 2017/0064115 A1 Mar. 2, 2017

(30) Foreign Application Priority Data

Sep. 2, 2015 (JP) .................................. 2015-172837

(51) Int. Cl.
 *H04N 1/00* (2006.01)
 *G06F 3/12* (2006.01)
 *H04N 1/44* (2006.01)

(52) U.S. Cl.
 CPC ....... *H04N 1/00891* (2013.01); *G06F 3/1213* (2013.01); *G06F 3/1214* (2013.01);
 (Continued)

(58) Field of Classification Search
 CPC ........... H04N 1/00891; H04N 1/00896; H04N 1/4433; H04N 2201/0094; H04N 1/00477;
 (Continued)

(56) References Cited

U.S. PATENT DOCUMENTS 7,218,750 B1 * 5/2007 Hiraishi .................. G06K 9/46
 382/100
8,743,386 B2 6/2014 Hara
 (Continued)

FOREIGN PATENT DOCUMENTS

CN 102256034 A 11/2011
CN 102970454 A 3/2013
 (Continued)

OTHER PUBLICATIONS

Chinese Office Action dated Sep. 25, 2018, in corresponding Chinese Patent Application No. 201610796761.1 (with English translation).
 (Continued)

*Primary Examiner* — Iriana Cruz
(74) *Attorney, Agent, or Firm* — Venable LLP

(57) ABSTRACT

An printing apparatus includes a printer configured to print an image on a printing medium, a network interface configured to receive, from an external device, a print job to be held, a memory configured to store the print job received by the network interface, and a user interface configured to accept, from a user, an execution instruction for the print job stored by the memory. In addition, a controller controls the printer to print based on the print job in accordance with the execution instruction accepted by the user interface, and a power controller performs control so that power is supplied to a predetermined device of the printer based on a reception of the print job by the network interface.

27 Claims, 10 Drawing Sheets

(52) U.S. Cl.
CPC .......... *G06F 3/1221* (2013.01); *G06F 3/1229* (2013.01); *G06F 3/1238* (2013.01); *H04N 1/00896* (2013.01); *H04N 1/4433* (2013.01); *G06F 3/1267* (2013.01); *H04N 2201/0094* (2013.01); *Y02D 10/1592* (2018.01)

(58) Field of Classification Search
CPC .......... H04N 2201/0072; G06F 3/1214; G06F 3/1221; G06F 3/1238; G06F 21/81; G06F 1/3206; G03G 15/5004
See application file for complete search history.

(56) References Cited

U.S. PATENT DOCUMENTS

| | | | |
|---|---|---|---|
| 9,350,889 B2 | 5/2016 | Hatano et al. | |
| 9,626,136 B2 | 4/2017 | Tsuchiya | |
| 2009/0257078 A1* | 10/2009 | Sawada | G06F 21/608 358/1.14 |
| 2009/0316178 A1* | 12/2009 | Tanaka | G06F 21/81 358/1.14 |
| 2011/0286028 A1 | 11/2011 | Kinouchi et al. | |
| 2011/0292444 A1* | 12/2011 | Koarai | G06F 3/1208 358/1.15 |
| 2013/0050759 A1* | 2/2013 | Tsuchiya | G06F 3/1285 358/1.15 |
| 2014/0078530 A1 | 3/2014 | Lee et al. | |
| 2014/0146366 A1* | 5/2014 | Kato | H04N 1/00466 358/1.15 |
| 2014/0245413 A1* | 8/2014 | Yasui | G06F 3/01 726/7 |
| 2016/0012171 A1* | 1/2016 | Visconti | G06F 17/5072 716/122 |
| 2016/0255228 A1* | 9/2016 | Oue | H04N 1/00891 358/1.13 |
| 2017/0177283 A1 | 6/2017 | Tsuchiya | |

FOREIGN PATENT DOCUMENTS

| | | |
|---|---|---|
| CN | 104683632 A | 6/2015 |
| JP | 2010-4150 | 1/2010 |
| JP | 2012-274575 A | 12/2010 |
| JP | 2011-5681 | 1/2011 |

OTHER PUBLICATIONS

Japanese Office Action dated Jun. 4, 2019, in corresponding Japanese Patent Application No. 2015172837 (with English translation).

\* cited by examiner

| ENERGIZING PART / POWER MODE | INPUT OPERATION UNIT (SWITCH 114d) | AUTHENTICATION OPERATION UNIT (SWITCH 114c) | SCAN UNIT (SWITCH 114b) | PRINTING UNIT (SWITCH 114a) |
|---|---|---|---|---|
| FIRST IDLE MODE (OPERABLE) | ○ | ○ | × | × |
| SECOND IDLE MODE (PRINTABLE) | ○ | ○ | × | ○ |
| THIRD IDLE MODE (COPYABLE) | ○ | ○ | ○ | ○ |
| FOURTH IDLE MODE (UNOPERABLE, PRINTABLE) | × | × | × | ○ |
| POWER-SAVING MODE | × | × | × | × |

○ : ENERGIZED    × : NON-ENERGIZED

FIG.3

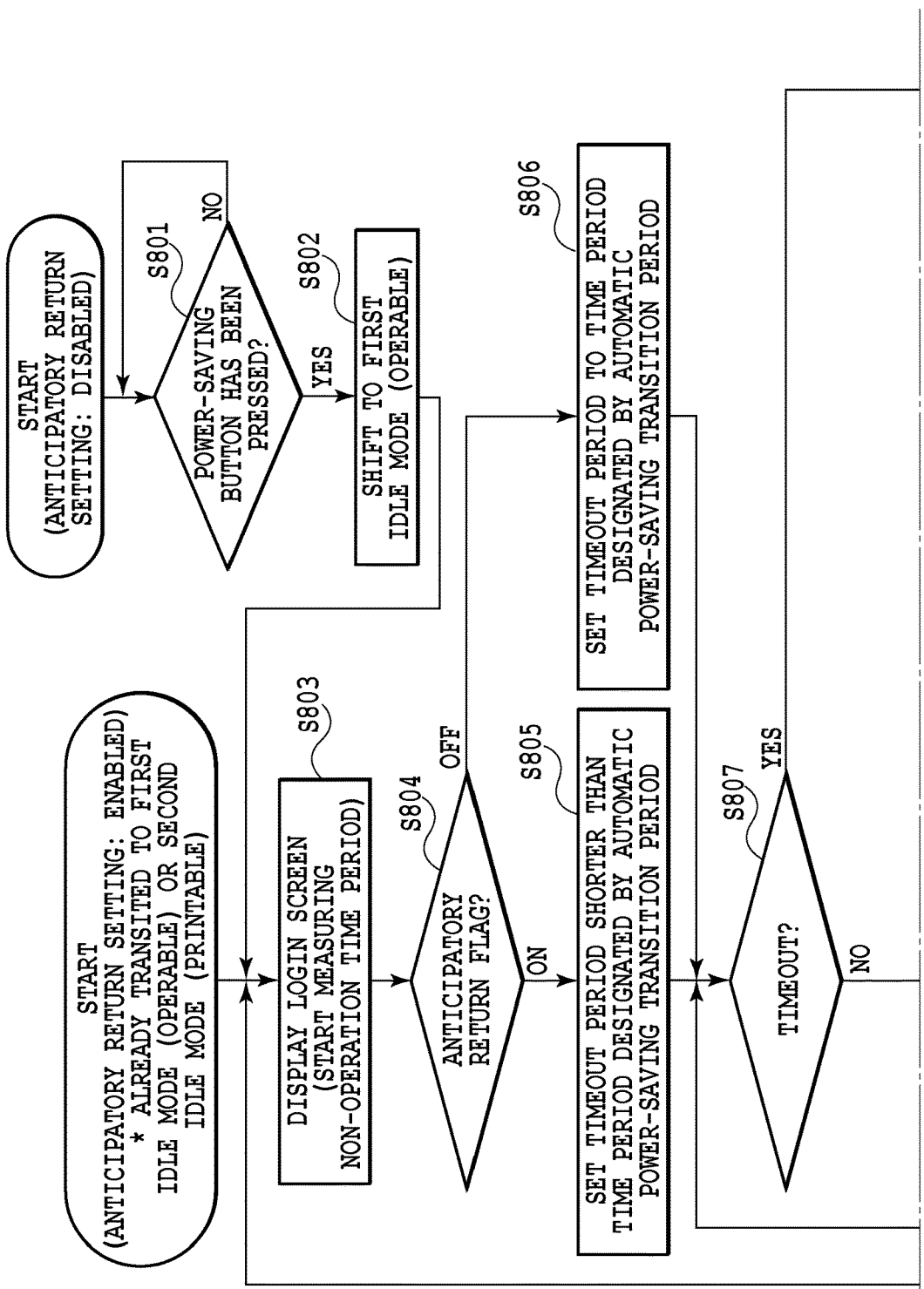

IMAGE FORMING APPARATUS, METHOD FOR CONTROLLING THE SAME, AND STORAGE MEDIUM

BACKGROUND OF THE INVENTION

Field of the Invention

The present invention relates to anticipatory return processing from a power-saving mode at the time of authentication printing.

Description of the Related Art

A Multi Function Peripheral (MFP) is equipment capable of executing a plurality of functions such as copying, communicating by a facsimile, and printing, and is generally used by sharing one or more MFPs with a few to a few tens of people. A user performs an operation in front of the MFP for using the copy function, whereas the user gives a print instruction remotely from a personal computer or the like via a network or the like for using the print function. Further, in the case of using the print function, if, for example, the user gives a print instruction to a different MFP that is not a target by mistake or the user forgets about giving the print instruction and does not pick up the printed material, the outputted printed material will be left on an output tray for a long time. This may be a cause of losing the printed material or other troubles, which may induce a significant problem if the printed material is highly confidential.

As countermeasures against such an information security risk, there is a function called authentication printing. The authentication printing is a function to execute printing by attaching an authentication attribute (a confidential attribute) to print data for executing a print instruction, whereby print data related to the print instruction is stored once in the MFP or a server and then user authentication is executed (see Japanese Patent Laid-Open No. 2011-005681). The user who has instructed the authentication printing moves to the place of the MFP of an output target and performs an operation for the user authentication such as holding an ID card over a card reader. After successfully logged in, the user is required to perform a print start instruction on the MFP. After going through such a series of operations, printing processing is at last started on the MFP.

As described above, in the case of the authentication printing, the printing processing is started after the print start instruction, which is executed after the user authentication, has been given. For this reason, the user must wait for the completion of the printing processing in front of the MFP. Also, as a high power saving performance is required in recent years, the MFP is designed to be promptly shifted to a power-saving mode if it is not used for a certain period. Under such circumstances, the MFP is highly likely to be in the power-saving mode at the time when the user instructs the authentication printing, whereby the MFP often fails to perform printing processing immediately but starts return processing from the power-saving mode. In other words, the user who uses an authentication print function needs to wait in front of the MFP for the total of a time period required for the return processing from the power-saving mode and a time period required for the print processing. Moreover, in a use case where all of the printing is set to be the authentication printing, for example, the user must wait in front of the MFP for a considerable time period for every printing even if a document is less confidential which originally requires no authentication.

In this respect, Japanese Patent Laid-Open No. 2010-004150, for example, discloses a method in which, after a user operation for authentication processing is completed, an operation mode is promptly shifted to a sleep print mode, and then returns to a sleep mode after the completion of the printing. However, in the method of Japanese Patent Laid-Open No. 2010-004150 as well, an image forming apparatus shifts to an operation state, which allows printing, only after the completion of a user operation for authentication processing, and accordingly, a user still has to wait in front of the apparatus for a considerable time period.

SUMMARY OF THE INVENTION

An image forming apparatus according to the present invention includes a printing unit for printing an image on a printing medium, a reception unit configured to receive, from an external device, a print job which causes the printing unit to execute printing in a power-saving state in which power supply to the printing unit is stopped, a storage unit for storing the print job received by the reception unit, an operation unit for accepting an execution instruction for the print job stored by the storage unit, a control unit for executing the print job stored by the storage unit in accordance with acceptance of the execution instruction by the operation unit, and a setting unit for setting whether to supply power to the printing unit before the execution instruction is accepted by the operation unit or to supply power to the printing unit after the execution instruction has been accepted by the operation unit.

Further features of the present invention will become apparent from the following description of exemplary embodiments (with reference to the attached drawings).

BRIEF DESCRIPTION OF THE DRAWINGS

FIG. 3 is an example of a table showing the types of power modes and their energizing parts in the MFP;

FIG. 8 is a diagram showing a relationship between FIGS. 8A and 8B,

FIGS. 8A and 8B are flowcharts showing a flow of processing in which a user who has requested authentication printing performs a print start instruction in front of the MFP to obtain a printed material.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
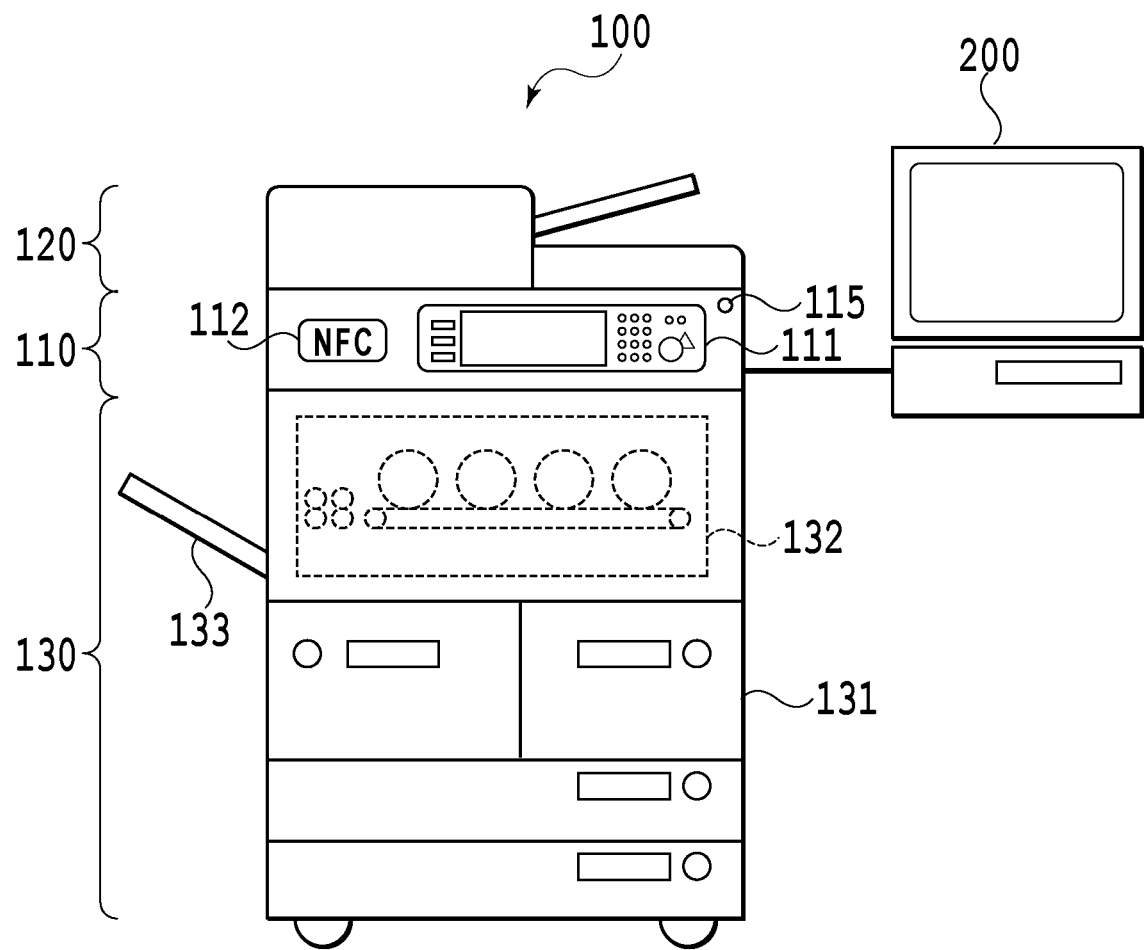
FIG. 1 is a view showing one example of a configuration of a print system.

FIG. 1 is a view showing one example of a configuration of a print system according to the present embodiment. The print system includes an MFP 100 as an image forming apparatus and a PC 200 as an external device, which are mutually connected via a network such as a LAN. The MFP 100 which is the image forming apparatus includes a controller unit 110 that controls the entire apparatus, a scan unit 120 that reads images, and a printing unit 130 that forms and outputs images on a printing medium. On the front side of the controller unit 110, there are an input operation unit 111 having buttons and the like arranged thereon for a user to perform various input operations and an authentication operation unit 112 that accepts a user's operation for user authentication by holding an ID card over the authentication operation unit 112 (e.g., NFC reader/writer). Before detailed explanations on the present invention are given, a copy function and a print function, which are the major functions of the MFP 100, will be described below with reference to FIG. 1.

[Copy Operation]

In a case of using a copy function, a user sets a document that needs to be copied on an Auto Document Feeder (ADF) or a document platen provided in the scan unit 120 and instructs the copying by, for example, pressing a copy button (not shown) on the input operation unit 111. Upon receiving the copy instruction, the scan unit 120 reads the document and generates image data. Then, in the printing unit 130, sheets are fed one by one from a sheet cassette 131, and, at a print engine 132, an image is formed on the sheet based on the generated image data through the processes of charging, exposing, developing, transferring, and fixing. Lastly, the sheet (a printed material) is discharged onto an output tray 133 and the copy operation is completed. The print engine 132 here is assumed to be of an electrophotographic system in the present embodiment, but is not limited to this.

[Print Operation]

A print function includes two types: one is a normal printing which requires no user authentication and the other is an authentication printing which requires user authentication.

First of all, the normal printing will be described. In the normal printing, a user performs a print instruction from the PC 200 and then a print job including print data (PDL data described in a page description language) is transmitted to the MFP 100. Then, printing processing is executed in the printing unit 130 without delay. In this case, image forming processes are the same as those in the copy operation. Specifically, an image based on the image data generated by interpreting the PDL data is formed on a sheet through the processes of charging, exposing, developing, transferring, and fixing, and the sheet (a printed material) is discharged onto the output tray 133 and thus the printing is completed. In the normal printing, if the user performs the print instruction from the PC 200, the printing processing in accordance with the print job is automatically executed at the MFP 100 and the printed material is discharged onto the output tray 133. For this reason, in a case where, for example, the user performs a print instruction to a different MFP that is not a target one by mistake or the user forgets about performing the print instruction and does not pick up a printed material, the printed material will be left on the output tray 133 for a long time. If a document to be printed is highly confidential, a risk in the aspect of security such as losing a printed material may arise. In order to cope with such a problem, there is an authentication print function.

Meanwhile, in the authentication printing, if the user performs a print instruction from the PC 200, a print job including print data with an authentication attribute is transmitted to the MFP 100. In the case of the authentication printing, printing processing is not automatically started in the MFP 100, but the steps are required to be taken to start the printing processing. The details are as follows:

1) The user who has performed the print instruction from the PC 200 moves to the front of the MFP 100;

2) If the MFP 100 is in a power-saving mode, the user performs operation to recover from the power-saving mode (e.g., pressing a power-saving button 115);

3) Once the MFP 100 is recovered from the power-saving mode, the user performs operation for user authentication by, for example, holding an ID card over the authentication operation unit 112;

4) If authentication processing results in success, a login is permitted, and a list of print data (print job) for the authentication printing requested by the user is displayed on a liquid-crystal display panel or the like on the input operation unit 111; and 5) The logged-in user selects desired print data (print job) from a screen displaying the list of the print data and performs a print start instruction (an instruction to execute the print job).

After the print start instruction has been performed, processes are the same as those in the normal printing. Specifically, an image based on the image data generated by interpreting the PDL print data is formed on a sheet through the processes of charging, exposing, developing, transferring, and fixing, and the sheet (a printed material) is discharged onto the output tray 133 and thus the printing is completed. In the authentication printing, the printed material is outputted in front of the logged-in user. Accordingly, the user can pick up the printed material before someone else is aware of its presence, and further, the possibility of the printed material being left untouched by the user can be eliminated.

Although the security risk is alleviated by use of the authentication print function, the printing processing is not started unless the user performs operations in front of the MFP 100, and thus, a waiting time until the user obtains the printed material will be longer than that in the normal printing. It will be effective as long as the user uses the authentication print function intentionally from the viewpoint of confidentiality. However, in an office environment where the apparatus is uniformly set to the authentication printing from the viewpoint of the security risk such as a situation in which the printed material is being left thereon, the user must wait in front of the MFP for a long time for every printing, which causes a great deal of inconvenience. The present invention is proposed to resolve such a problem.

[Control System in MFP]

Figure 2:
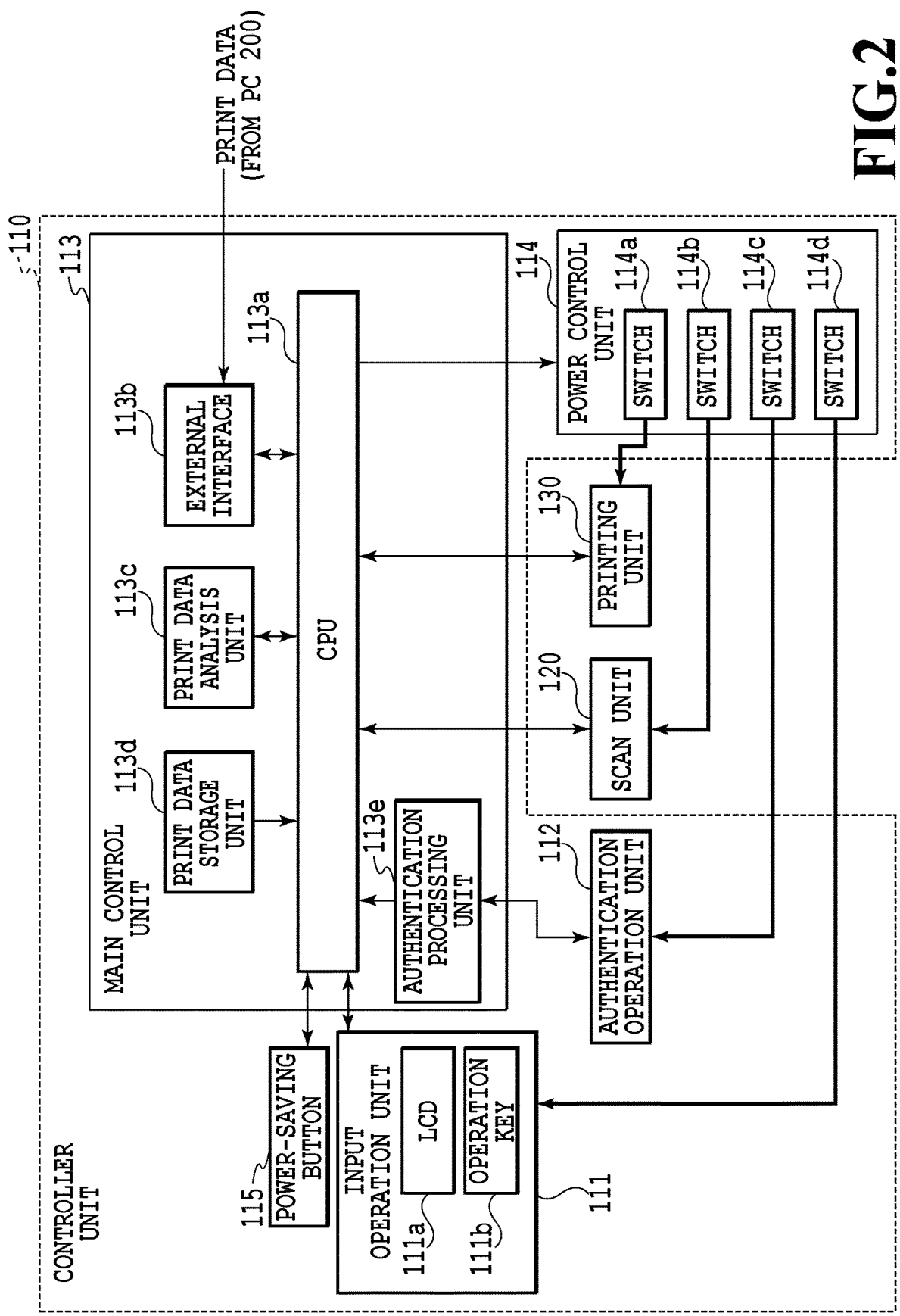
FIG. 2 is a block diagram showing details of a control system for an MFP.

FIG. 2 is a block diagram showing details of a control system for the MFP 100 according to the present embodiment. As described above, the controller unit 110 includes the input operation unit 111, the authentication operation unit 112, and the power-saving button 115. FIG. 2 further shows a main control unit 113 that controls the entire apparatus including the above units and a power control unit 114 that controls power supply to the major units in the apparatus.

The input operation unit 111 is composed of a liquid-crystal display panel (LCD) 111a having a touch screen function capable of displaying various information and performing input operation, and an operation key 112b including a physical button for executing functions that are relatively frequently used. This physical button includes a button for inputting the number of sheets to be printed and a button for performing a copy/print start instruction. The power-saving button 115 is a button for instructing a shift to the power-saving mode and a return from the power-saving mode, and is configured to be electrically separated from the input operation unit 111 so that the pressing of the button is detectable even in a state where the input operation unit 111 is powered down. By pressing this power-saving button 115, a toggle transiting of power modes in the MFP 100, that is, transiting to the power-saving mode or restoring from the power-saving mode to bring the power mode to an idle state can be achieved.

The main control unit 113 includes a CPU 113*a*, an external interface 113*b*, a print data analysis unit 113*c*, a print data storage unit 113*d*, and an authentication processing unit 113*e*. The CPU 113*a* executes various processing in accordance with a program stored in a non-illustrated ROM or the like. The external interface 113*b* is an interface for exchanging various data with the PC 200 via a network such as a LAN. The print data analysis unit 113*c* executes rendering processing which interprets the PDL of the received print data to convert it into bitmap image data for the printing unit 130. In addition, the print data analysis unit 113*c* also executes determination processing for determining whether or not the inputted print data has an authentication attribute attached thereto (whether the normal printing or the authentication printing). The print data storage unit 113*d* is a storage for storing (a print job including) received print data, and is composed of, for example, an HDD. The authentication processing unit 113*e* executes the authentication processing for a user who has performed a print instruction at the time of, for example, the authentication printing. More specifically, based on information such as an ID obtained via the authentication operation unit 112, the authentication processing unit 113*e* verifies the ID against an already-registered ID to determine if a user who is trying to log in is an authorized user, and if so, permits the login for the user.

The power control unit 114 can be remotely controlled by the CPU 113*a*, and includes switches (such as an FET and a relay) 114*a* to 114*d* for turning on/off the power supply to each unit. The switch 114*a* switches between on/off of the power supply to the printing unit 130, the switch 114*b* to the scan unit 120, the switch 114*c* to the authentication operation unit 112, and the switch 114*d* to the input operation unit 111. Thus, the CPU 113*a* controls the power supply to each of the units in the MFP 100 by turning these switches on/off.

[Power Mode]

FIG. 3 is a table showing the types of power modes and their energizing parts in the MFP 100. In the table shown in FIG. 3, a circle 'O' indicates an energized state while an 'x' indicates a non-energized state. Items listed in the top row are major units (hereinafter referred to as a "module") in the MFP 100 which are controlled by the above 114*a* to 114*d*. Items listed in the left column are five types of power modes provided in the MFP 100. The power modes are roughly classified into two modes: an idle mode in which an operator is generally assumed to be in front of the MFP 100 and a power-saving mode in which the operator is assumed not to be in front of the MFP 100 and in which power supply to all modules including a print engine is stopped. Further, the idle mode has four types of modes, namely, from first to fourth modes. The first idle mode is only available for the input operation unit 111 and the authentication operation unit 112, and is a mode in which power supply to the print engine is stopped. The second idle mode is available for the input operation unit 111 and the authentication operation unit 112, and is a mode in which power is supplied to the printing unit 130 and in which the print function is available. The third idle mode further allows the scan unit 120 to be power supplied and the copy function is also available. The fourth idle mode is a mode to be shifted in a case where a print job based on a print instruction for the normal printing is received under the power-saving mode, and is capable of print output while the input operation unit 111 and the authentication operation unit 112 are unavailable. A user who has performed a normal printing instruction to the MFP 100 under the power-saving mode only has to pick up a printed material discharged onto the output tray 133 and is not required to make any operation in the input operation unit 111. In this case, since there is no need to bring the input operation unit 111 in an available state by, for example, making the LCD panel 111*a* lit, power is not supplied to the input operation unit 111 and the authentication operation unit 112, but is only supplied to the printing unit 130. Meanwhile, since the first to third idle modes are assumed that the operator is in front of the MFP 100, the LCD panel 111*a* on the input operation unit 111 is being lit.

The CPU 113*a* in the main control unit 113 notifies the power control unit 114 of the current state of the power mode, and upon receipt of such notification, the power control unit 114 turns each of the switches 114*a* to 114*d* on/off and controls power supply to each of the modules. As a result, each of the modules in the MFP 100 can be powered down or activated.

Incidentally, as for a circuit around the CPU 113*a* which is not controlled by the switches 114*a* to 114*d* in the power control unit 114, a technique such as already-known Connected Standby is applied. Specifically, a state of waiting data is kept at extremely low supply power, and at the time of data reception, the power is continuously supplied to the CPU 113*a* and its peripheral modules as required for processing. Using such an ultralow power standby technique, data can be received via the external interface 113*b*.

[User-Waiting Time in Conventional Authentication Printing]

Here, the user-waiting time in the conventional authentication printing will be reviewed.

Figure 4:
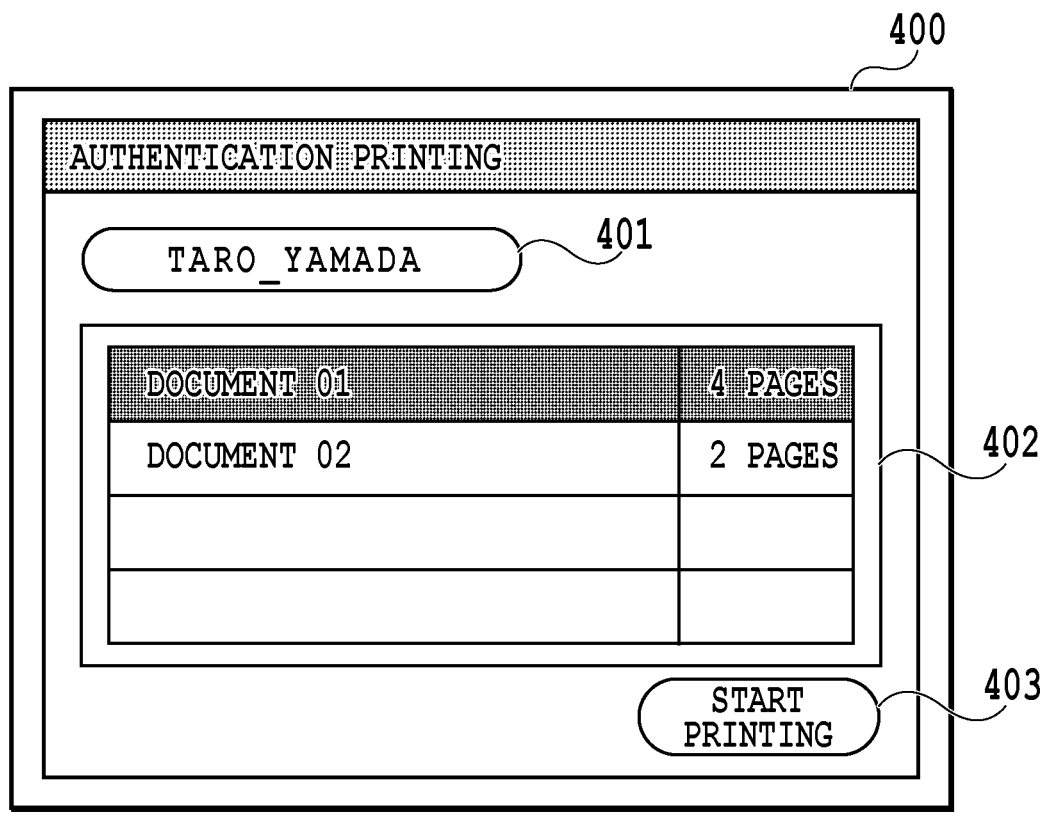
FIG. 4 is a view showing one example of a screen for authentication printing.

Various aspects can be considered for a hardware configuration for the authentication operation unit 112. In an aspect of connection to a versatile bus interface, for example, a return from a waiting state cannot be achieved by the above-mentioned ultralow power standby technique. As described above, in the power-saving mode, power supply to the authentication operation unit 112 is stopped (see the table of FIG. 3). Accordingly, under the power-saving mode, the CPU 113*a* will never be recovered from a sleep state just by an authentication operation made by a user such as holding an ID card over the authentication operation unit 112. Accordingly, a user who desires to perform authentication printing should first press the power-saving button 115 and wait until the power mode shifts to the first idle mode in order to bring the authentication operation unit 112 to a usable state. Further, the user should confirm that the LCD panel 111*a* on the input operation unit 111 is lit and that a login screen (not shown) prompting for user authentication is displayed, and then, should perform an operation such as holding the ID card over the authentication operation unit 112. As such, these steps are required to be taken by the user. On this occasion, a message prompting the user authentication such as the wording "Please log in." is displayed on the login screen. FIG. 4 shows one example of a UI screen (an authentication print screen) used for the authentication printing displayed on the LCD panel 111*a* after successfully logged in by the user. In the authentication print screen 400 shown in FIG. 4, a user ID display column 401 displays an ID of a login-permitted user (a user name "TARO YAMADA" in this case), whereby the name of a current logged-in user can be identified. A document display column 402 displays a list of a document name (a file name) of print data included in a print job related to an instruction on the authentication printing by the logged-in user together with information on the number of pages. The user who has performed an instruction on the authentication printing moves to the place of the MFP 100 and presses the power-saving button 115, performs operation for the user authentication for a login, confirms and selects a document (print data) in which the user has instructed printing on the authentication print screen, and presses a print start button. Then, as the execution of the printing processing is ensured by the print start instruction given by the logged-in user, the CPU 113a in the main control unit 113 notifies the power control unit 114 of a shift from the first idle mode to the second idle mode that allows print output. Upon receipt of this notification, the power control unit 114 turns the switch 114a on. Thus, the power is applied to the printing unit 130, the input operation unit 111, and the authentication operation unit 112. In the printing unit 130, imaging preparation processing such as initialization and image adjustment of the print engine 132 is executed, and after completion of such imaging preparation processing, a sheet is fed from the sheet cassette 131. Then, the printing processing is executed in the order of charging, exposing, developing, transferring, and fixing at the print engine 132, and a printed material is discharged onto the output tray 133.

Here, a user-waiting time from a time point when the user presses the power-saving button 115 (a shift from the power-saving mode to the first idle mode) to a time point when the user performs the print start instruction, through the user authentication and the selection of a document to be printed, is assumed to be a "Start-Instruction WT." Further, a user-waiting time from the print start instruction given by the logged-in user to the start of the actual printing processing through the imaging preparation processing is assumed to be a "Printing Start WT." Still further, a user-waiting time from the start of the printing processing to the end of the printing processing is assumed to be a "Printing End WT." In this case, an entire user-waiting time required for the conventional authentication printing is "Start-Instruction WT+Printing Start WT+Printing End WT."

Recent image forming apparatuses, not limiting to the MFP, are often designed to start energization for only a module serving a function that has been ensured to be used so as to operate the apparatus in a better power-saving manner. In the case of the MFP, undesired drive noise and wasteful power consumption are designed to be avoided by stopping power supply to the printing unit 130 until the execution of the printing processing is ensured. In the meantime, the user is forced to be in front of the apparatus for the above-described "Printing Start WT."

Under such circumstances, the present invention is directed to start energization to each module at the time of the authentication printing prior to the user's pressing of a power-saving button or operation for the user authentication so as to make the return from a sleep state in an early stage. Due to such control, among the entire user-waiting time, Start-Instruction WT and Printing Start WT are reduced to achieve high-speed authentication printing.

[Operation Setting in Power-Saving Mode]

Figure 5A:
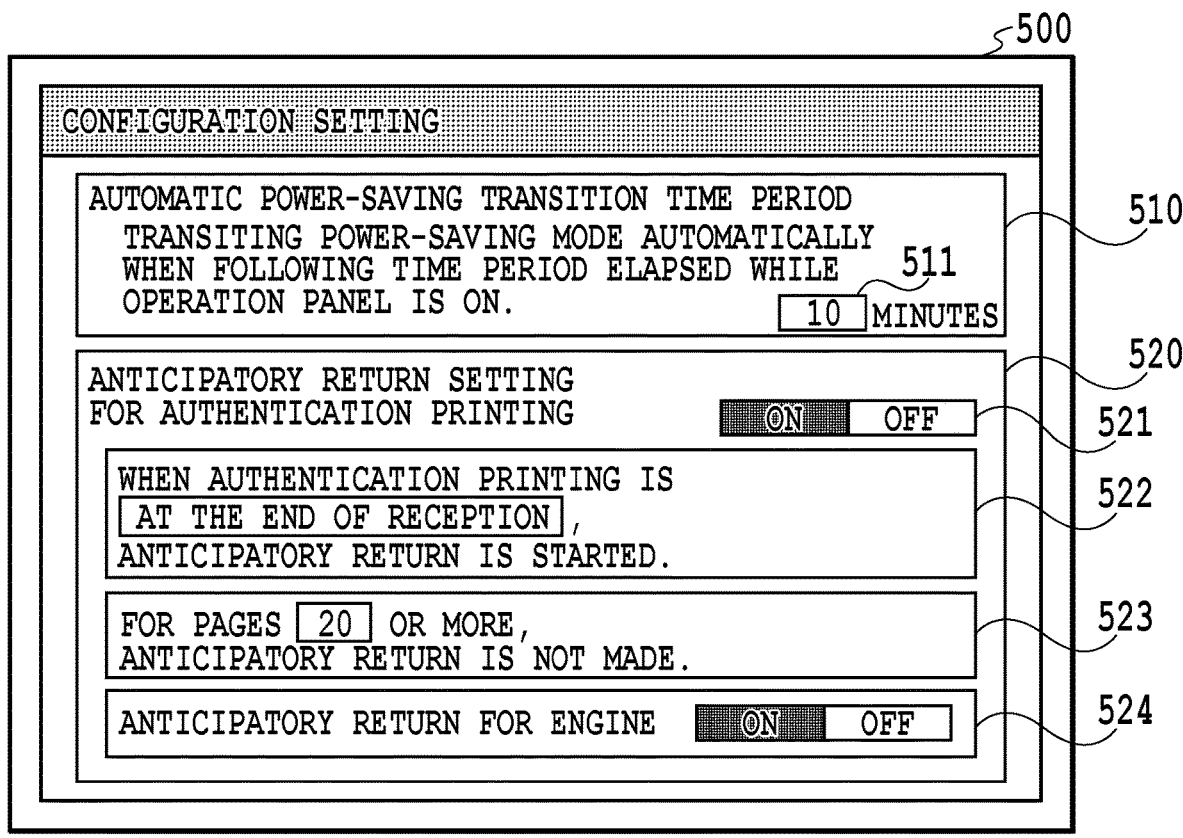
FIGS. 5A and 5B are views showing one example of a screen for a configuration setting.
Figure 5B:
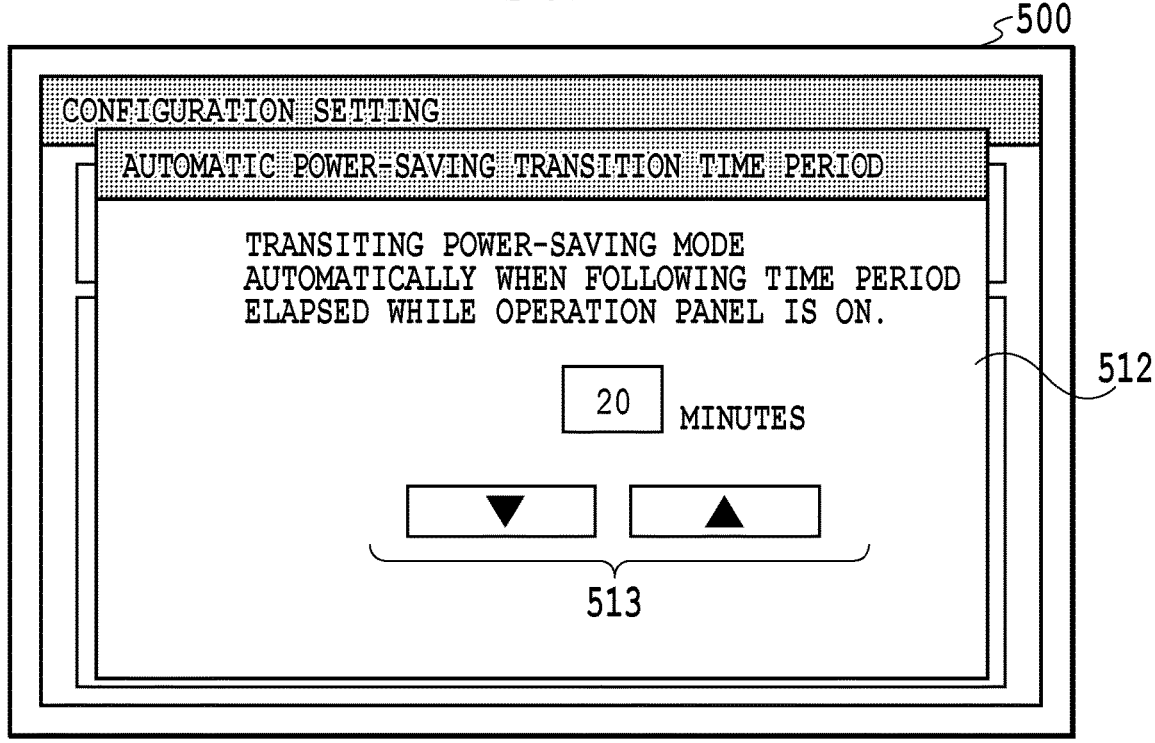

In the present embodiment, a user can optionally select whether to perform control (hereinafter referred to as high-speed authentication print control) of an anticipatory return on a particular module upon authentication printing, and if thus selected to perform control, which process is to be performed for the control. Before detailed explanations on the high-speed authentication print control are given, operation setting in the power-saving mode for preparation for the control will be described. FIGS. 5A and 5B are views showing one example of a UI screen (a configuration setting screen) for performing various operation settings in the power-saving mode. The UI screen as shown in FIG. 5A is displayed on the LCD panel 111a in the input operation unit 111, and the user can perform desired settings such as shift timing to the power-saving mode or anticipatory return processing which is a feature of the present invention. Explanations in detail will be given below.

A frame 510 in a configuration setting screen 500 relates to a so-called sleep function, and is a setting column (an automatic power-saving transition time period setting column) for designating a time period until the power mode is automatically transited to the power-saving mode. If the user performs touch operation on an input column 511 in the automatic power-saving transition time period setting column 510, a subwindow 512 is displayed as shown in FIG. 5B. The user presses an adjustment button 513 in the subwindow 512 to set a desired time period by increasing/decreasing the time period (unit: minute) until the transiting to the power-saving mode. If the MFP 100 is not used for a predetermined time (10 minutes in the present embodiment), the power mode is automatically shifted to the power-saving mode.

A frame 520 in the configuration setting screen 500 is an anticipatory return setting column for performing settings on anticipatory return at the time of authentication printing. A selection button 521 in the anticipatory return setting column 520 is a button for designating whether anticipatory return is to be executed on a particular module at the time of authentication printing. If the user selects "ON," an anticipatory return setting is set to be "enabled," and if the user selects "OFF," the anticipatory return setting is set to be "disabled." In the case where the anticipatory return setting is set to be disabled, the authentication printing will be controlled as usual (hereinafter referred to as normal authentication print control). Meanwhile, by selecting "ON," sub-menus 522 to 524 are further displayed and detailed settings for the anticipatory return can be made by the user.

In the submenu 522, timing for the anticipatory return can be designated from among the following three types:

1) At the end of reception:
This is a time point when reception of entire print data ends. If the print data has 10 pages in total, for example, the anticipatory return processing of a module starts at the time point when the reception of the final page, i.e., page 10, ends.

2) At the start of reception:
This is a time point when reception of the print data starts. Regardless of the number of pages for the print data, the anticipatory return processing of the module starts at the time point when the reception of the first page, i.e., page 1, ends.

3) At a time immediately before the end of reception:
This is a time point immediately before the end of reception of the print data. If the print data has 10 pages in total, for example, the anticipatory return processing of the module starts at the time point when the reception of page 9 ends. The above example is a specific example of a case where "90% out of total pages" is set as a threshold to determine the time point immediately before the end of reception of the print data, but is not limited to this. Fixing a percentage is optional, and further, data amount may be set as a reference instead of the number of pages and a threshold such as "90% out of total data amount" may be set. In this case, if the entire data amount of print data is, for example, 1 Mbyte, the anticipatory return processing of the module starts at the time point of receiving 900 Kbytes.

In the example shown in FIG. 5A, the above-described 1) "At the end of reception" is designated. Print data transmitted from the PC 200 is stored in the print data storage unit 113*d* via the external interface 113*b*. Simultaneously, in the print data analysis unit 113*c*, the timing of the anticipatory return is determined in accordance with a content designated by the submenu 522.

In the submenu 523, in a case where the number of pages of print data exceeds a predetermined number, the user can designate cancelling the anticipatory return processing. If the number of pages to be printed is the predetermined number or more, anticipatory return can be cancelled due to the following reasons.

Among the user-waiting time required for the authentication printing, a time period from the pressing of the power-saving button 115 to the actual start of printing processing by the print engine 132 is equivalent to the above-described "Start-Instruction WT+Printing Start WT." Further, since a sheet is conveyed at a constant speed to take each of the processes during the printing processing, the required time (Printing End WT) is substantially proportionate to the number of sheets to be printed. Specifically, the less the number of pages to be printed is, the higher the ratio of Start-Instruction WT and Printing Start WT to the entire user-waiting time tends to become. Thus, the less the number of pages to be printed is, the more the user feels discontent for the increasing waiting time. Moreover, in a case of printing the large number of pages, the most of the waiting time will be a time period for printing processing and an advantageous result produced by the present invention will be lessened. For this reason, the submenu 523 is provided to enable the user to set not to execute anticipatory return in a case where a predetermined number of pages or more is to be printed. Also, in this case, data amount may be specified instead of the number of pages.

In the submenu 524, the user can designate whether or not to include the print engine 132 as a target of the anticipatory return processing. During the power-saving mode, power supply to the printing unit 130 is stopped (see the table of FIG. 3 as described above) and the print engine 132 is also not in operation. In initialization (imaging preparation) processing of the print engine 132, a fixing roller (not shown) is rotated to check occurrence of a jam and a fixing module (not shown) starts to make preheating, thereby causing some noise. For this reason, if such a driving noise is bothersome, the user can designate "OFF" on the submenu 524 so as to remove the print engine 132 which is the cause of the noise from the target of the anticipatory return processing. Since there may be a case where the user performs an instruction on the authentication printing but does not immediately moves to the place of the MFP 100 to perform a print start instruction, the anticipatory return of the module which is accompanied by the noise occurrence can be selected to be removed from the target.

[Control of Print Operation]

Figure 6:
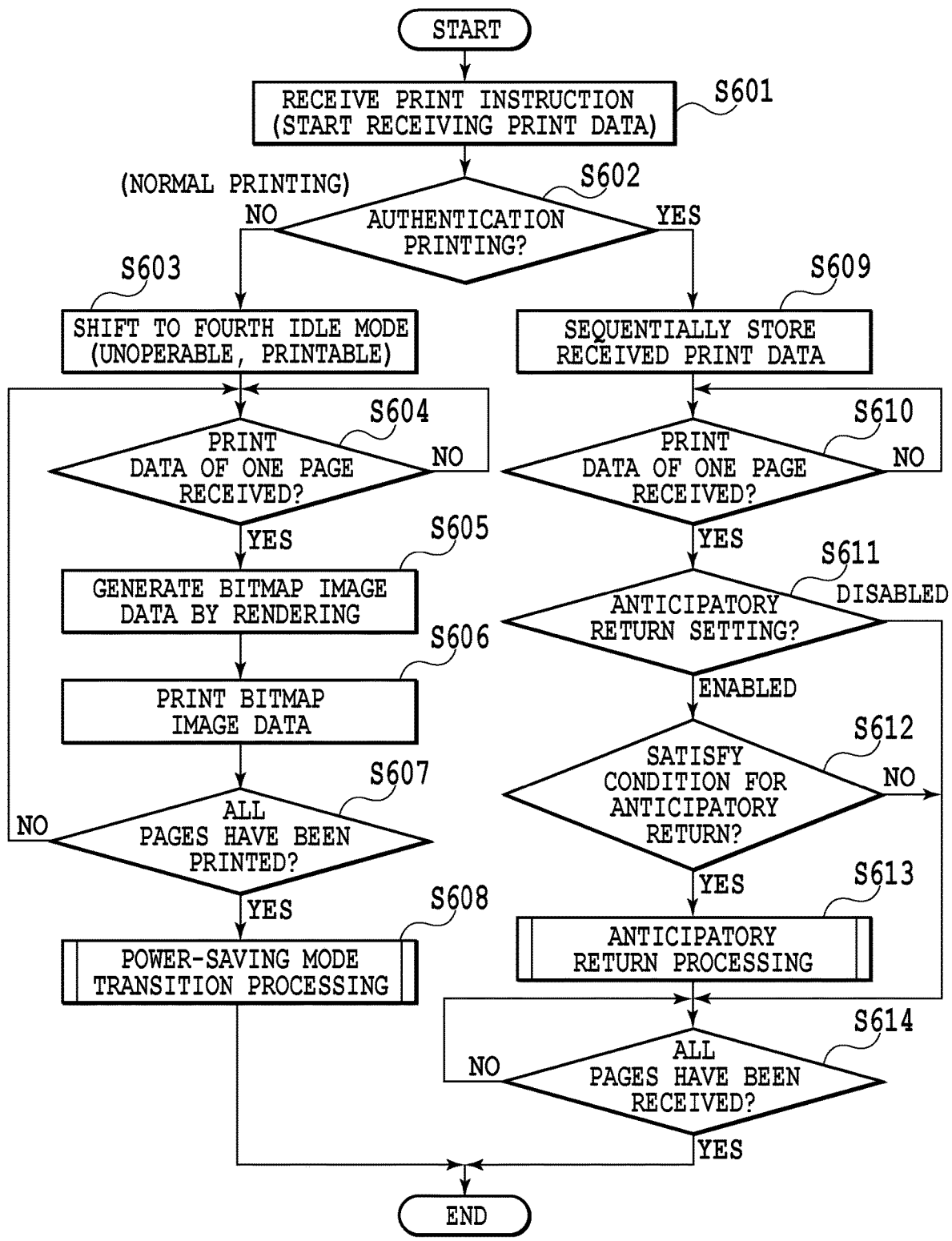
FIG. 6 is a flowchart showing a flow of controlling a print operation in a case of receiving a print instruction under a power-saving mode.

Next, the control of the print operation in a case of receiving a print instruction under the power-saving mode (where power supply to major modules is all stopped) in the MFP 100 will be described below in detail. FIG. 6 is a flowchart showing a flow of controlling the print operation in a case of receiving a print job from the PC 200 under the power-saving mode. A series of processing below is achieved by allowing the CPU 113*a* to load a program stored in a non-illustrated ROM or the like to a non-illustrated RAM and by executing the resultant program.

In Step 601, the reception of the print job relating to a print instruction is started at the external interface 113*b*.

In Step 602, a determination is made in the print data analysis unit 113*c* as to whether the received print job relates to authentication printing (whether the received print data included in the print job is the one having an authentication attribute). As a result of the determination, if the print data has no authentication attribute (the case of normal printing), a process proceeds to Step 603. Meanwhile, if the print data has an authentication attribute (the case of authentication printing), the process proceeds to Step 609.

First, the case of the normal printing (Step 603 to Step 608) will be described.

Since a mode is in the power-saving mode at this moment, printing processing cannot be executed. Accordingly, in Step 603, a transition to the fourth idle mode is instructed to the power control unit 114 so as to bring the printing processing to an executable state. Upon receiving this instruction, the power control unit 114 starts power supply to the printing unit 130, and imaging preparation processing is started in the printing unit 130.

In Step 604, a determination is made as to whether the reception of the print data of one page is completed. If the reception of one page is completed, the process proceeds to Step 605. Meanwhile, if the reception of one page is not completed, the reception of one page is checked again after the lapse of a predetermined time period.

In Step 605, rendering processing is executed in the print data analysis unit 113*c* by interpreting the PDL in the received print data of one page and converting it to bitmap image data that is usable in the printing unit 130. Then, thus generated bitmap image data is sent to the printing unit 130.

In Step 606, the printing processing in accordance with the bitmap image data is executed in the printing unit 130. Specifically, an image based on the bitmap image data is formed through the processes of charging, exposing, developing, transferring, and fixing on a sheet fed from the sheet cassette 131. The sheet (a printed material) having the image formed thereon is discharged onto the output tray 133.

In Step 607, as for the print job for the normal printing received in Step 601, a determination is made as to whether all pages of the printing processing is completed. If there is any page in which the printing processing are not yet completed, the process returns to Step 604, followed by the rendering and printing processing on each page. Meanwhile, if all pages of the printing processing are completed, the process proceeds to Step 608.

In Step 608, power-saving mode transition processing which will be described later is executed, and a power mode returns to the power-saving mode again. Thereafter, this processing is completed.

As such, the normal printing has a flow in which the printing processing is automatically started to output a printed material in accordance with a print instruction given by a user. In a use case where print data includes only a few pages in total and the MFP 100 is located close to the place of the user (PC 200) which only takes less than one minute, the printed material is already discharged onto the output tray 133 at the time when the user arrives at the place of the MFP 100.

Next, the case of authentication printing (Step 609 to Step 614) will be described.

In Step 609, in the print data storage unit 113*d*, the print data (print job) transmitted from the PC 200 is sequentially stored in a non-illustrated HDD or the like. Such reception and storing of the print data (print job) continues until going through all pages of the print data concurrently with the processing of Step 610 and thereafter.

In Step 610, a determination is made as to whether the reception of the print data of one page is completed. If the reception of one page is completed, the process proceeds to Step 611. Meanwhile, if the reception of one page is not completed, the reception of one page is checked repeatedly until the completion of the reception of one page.

In Step 611, a determination is made as to whether anticipatory return processing is to be executed for a module. To be more specific, it is determined whether "ON" is selected at the button 521 in the anticipatory return setting column 520 in the configuration setting screen 500 as described above and anticipatory return for the module is set to be enabled. If the setting is enabled, the process proceeds to Step 612. Meanwhile, if the setting is disabled, the process proceeds to Step 614.

In Step 612, a determination is made as to whether timing for executing anticipatory return processing has arrived. To be more specific, by referring to setting contents (in the present embodiment, there are three types: at the end of reception, at the start of reception, and at immediately before the end of reception) in the submenu 522 in the anticipatory return setting column 520 as described above, it is determined whether conditions on such setting contents are satisfied. As a result of the determination, if the timing for executing the anticipatory return processing has arrived, the process proceeds to Step 613. Meanwhile, if the timing for executing the anticipatory return processing has not arrived yet, the process proceeds to Step 614.

Figure 7:
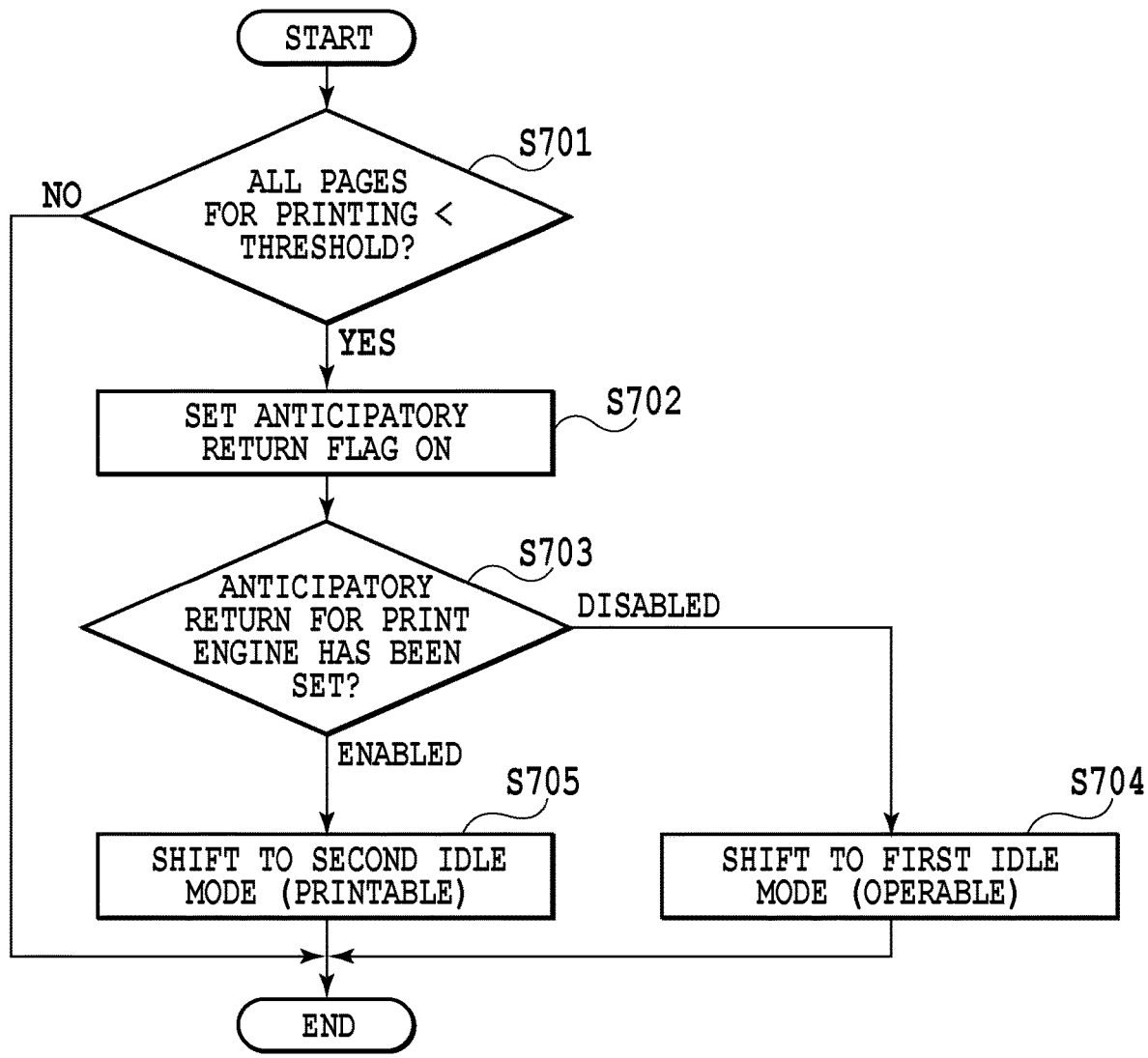
FIG. 7 is a flowchart showing details of anticipatory return processing.

In Step 613, the anticipatory return processing is executed for the module. FIG. 7 is a flowchart showing details of the anticipatory return processing.

In Step 701, a determination is made as to whether the number of pages for the print data exceeds a predetermined number (threshold). With respect to the threshold here, the setting content in the submenu 523 in the anticipatory return setting column 520 as described above is referred to. As a result of the determination, if the number of pages for the print data does not exceed the predetermined number (threshold), the process proceeds to Step 702. Meanwhile, if the number of pages for the print data exceeds the predetermined number (threshold), the anticipatory return processing is skipped and thus is not executed. For example, in a case where 20 is set as a threshold for the number of pages and the actual number of pages for the print data is 25, the anticipatory return processing is not executed and the process returns to the flow of FIG. 6.

In Step 702, a flag (an anticipatory return flag) indicating whether to execute the anticipatory return processing in the case of authentication printing is set to be "ON" which refers to execution thereof. Meanwhile, as will be described later, an initial value (a default value) of the anticipatory return flag is "OFF" which refers to non-execution.

In Step 703, a determination is made as to whether the anticipatory return processing is executed for the print engine 132. To be more specific, it is determined whether "ON" is selected in the submenu 524 in the anticipatory return setting column 520 and the anticipatory return for the print engine 132 is set to be enabled. As a result of the determination, if the anticipatory return for the print engine 132 is set to be disabled, the process proceeds to Step 704. Meanwhile, if the anticipatory return is set to be enabled, the process proceeds to Step 705.

In Step 704, a transition to the first idle mode from the power-saving mode is instructed to the power control unit 114. Upon receiving the instruction, the power control unit 114 starts power supply to the input operation unit 111 and the authentication operation unit 112. Consequently, a login screen (not shown) is displayed on the LCD panel 111a, and the authentication operation unit 112 is in a state where an ID card is always readable. However, since power supply to the printing unit 130 is still stopped, the anticipatory return is not made for the print engine 132 (i.e., the imaging preparation processing is not executed).

In Step 705, a transition to the second idle mode from the power-saving mode is instructed to the power control unit 114. Upon receiving the instruction, the power control unit 114 starts power supply to the input operation unit 111, the authentication operation unit 112, and the printing unit 130. Consequently, the login screen (not shown) is displayed on the LCD panel 111a, and the authentication operation unit 112 is in a state where an ID card is always readable and the imaging preparation processing is started at the printing unit 130.

The above is the content of the anticipatory return processing. The explanation will be back to the flowchart of FIG. 6 again. Note that a method of giving notification to prompt for user authentication may not be limited to displaying on a login screen but instead (or also) may be use of a voice. If the anticipatory return processing is completed, the process proceeds to Step 614.

In Step 614, a determination is made as to whether reception of all pages of the print data has been completed with respect to the print job on authentication printing received in Step 601. If all pages of the print data have not yet been received, checks are repeated until the reception for all pages is completed. Upon receiving the print data of all pages, this processing is completed.

The above explanations are regarding control of the print operation in the MFP 100 in the case of receiving the print job from the PC 200 under the power-saving mode. Furthermore, in the case where authentication printing is designated for the received print job, the "print control of authentication printing" will then be executed as described below.

[Print Control of Authentication Printing]

Figure 8B:
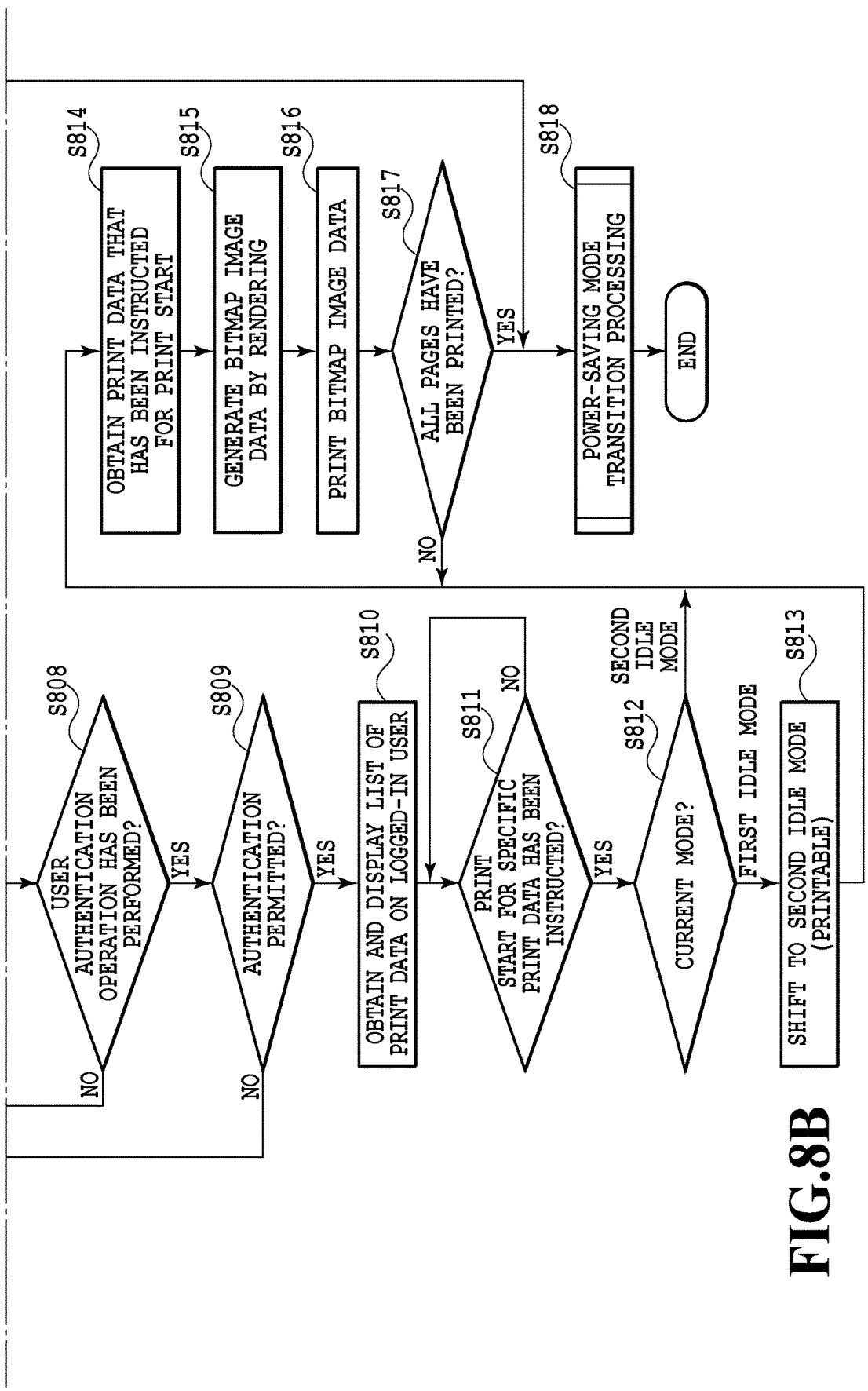

Subsequently, explanations will be given, as for authentication printing in which the print data (print job) is stored in the MFP 100 as described above, on processing where the user performs a print start instruction (an instruction to execute a print job) and thus obtains a printed material. FIGS. 8A and 8B are flowcharts showing a flow of processing from a time point where a user who requests authentication printing performs the print start instruction in front of the MFP to a time point where the user obtains the printed material. Since the print control for the authentication printing in the present embodiment includes high-speed authentication print control having the anticipatory return of a module and normal authentication print control without the anticipatory return, FIGS. 8A and 8B illustrate the flow corresponding to those two cases. Note that a series of processing in the flow is also achieved by allowing the CPU 113a to load a program stored in a non-illustrated ROM or the like to a non-illustrated RAM and by executing the resultant program.

In the flowchart shown in FIGS. 8A and 8B, Steps 801 and 802 indicate processing in the case of the normal authentication print control (where anticipatory return setting is disabled). For the case of the high-speed authentication print control (where anticipatory return setting is enabled), the processing is started from Step 803. Explanations in detail will be given below.

In the case of the normal authentication print control, a determination is made in Step 801 as to whether the power-saving button 115 is pressed by a user. If the power-saving button 115 is detected to be pressed, the process proceeds to Step 802. Meanwhile, if the power-saving button 115 is not detected to be pressed, detection monitoring continues.

In Step 802, a transition to the first idle mode from the power-saving mode is instructed to the power control unit 114. Upon receiving the instruction, the power control unit 114 starts power supply to the input operation unit 111 and the authentication operation unit 112.

In Step 803, the above-described login screen (not shown) is displayed on the LCD panel 111*a* in the input operation unit 111. Also, the authentication operation unit 112 is in a state where an ID card is always readable. As such, in the case of the normal authentication print control, the user presses the power-saving button 115 so that the login screen is displayed on the LCD panel 111*a*. Meanwhile, in the case of the high-speed authentication print control, since a transition to the first or second idle mode has been completed by anticipatory return processing, the login screen is already being displayed at the time the user moves in front of the MFP 100. Incidentally, in a case where the user fails to make operation for a login, for example, and a non-operated state continues, the mode returns to the power-saving mode after the lapse of a predetermined time period. Accordingly, measurement of non-operation time period is started concurrently with the display of the login screen. Then, if there is some kind of operation, the measurement of non-operation time period is reset, and remeasurement is started from the time point of such reset.

In Step 804, a determination is made as to whether the anticipatory return flag is ON or OFF. If ON is set in Step 702 for the above-described anticipatory return processing (the flowchart of FIG. 7), the process proceeds to Step 805, and if OFF is set, the process proceeds to Step 806.

In Step 805, as a time period (timeout period) until transiting automatically to the power-saving mode in the case where non-operation state continues, a time period shorter (e.g., two minutes) than the time period designated in the above-described automatic power-saving transition time period setting column 510 (e.g. ten minutes) is to be set. In this Step, a reason for setting a timeout period shorter than the time period designated as the automatic power-saving transition time period is as follows.

For example, assuming that a long time period such as a few hours has been set in the automatic power-saving transition time period setting, if the user has not come to the place of the MFP 100 although the high-speed authentication print control has been executed, the LCD panel 111*a* will be in an ON state for a long time (no transition to the power-saving mode for a while). The anticipatory return for a module in the high-speed authentication print control is based on an assumption that the user immediately performs operation in front of the MFP. Since the LCD panel 111*a* is lit to display the login screen without any delay from the time point when the user performs a print instruction from the PC 200 at a distant location, the MFP appears to be automatically activated from another's eye. Accordingly, if the module is activated by the anticipatory return using the high-speed authentication print control and the non-operation state continues thereafter, it is desirable that the mode promptly returns to the power-saving mode. In order to achieve this, a time period shorter than the normal automatic power-saving transition time period is set so as to cause the MFP to promptly return to the power-saving mode. Note that a set period is set to two minutes in the present embodiment, because a user, under normal circumstances, often picks up a printed material within one minute. There may be a case, of course, where setting one minute or five minutes is more appropriate depending on the size of an office. In such a case, a setting column for designating a time period to be set in this step may be separately provided in the anticipatory return setting column 520 in the configuration setting screen 500 as described above so that a user can set any time period. On this occasion, a manner of designating a time period may be like 50%, for example, of the time designated in the input column 511 in the automatic power-saving transition time period setting column 510.

In Step 806, as a time period (timeout period) until transiting automatically to the power-saving mode in the case where non-operation state continues, the time period (e.g., ten minutes) designated in the automatic power-saving transition time period setting column 510 as described above is set.

In Step 807, a determination is made as to whether a timeout period set in Step 805 or 806 has elapsed (whether a predetermined time has elapsed in the non-operation state from the time point when the login screen has been displayed). If the timeout period has elapsed in the non-operation state, the process shifts to Step 818, and the power-saving mode transition processing which will be described later will be executed. Meanwhile, if the timeout period has not elapsed, the process proceeds to Step 808.

In Step 808, a determination is made as to whether the user has performed operation for a login. If operation such as holding an ID card over the authentication operation unit 112 is detected, the process proceeds to Step 809. If operation for the login is not detected, the process returns to Step 807 and the arrival of the timeout period is checked.

In Step 809, authentication processing is executed for a user who has attempted to log in. To be more specific, information read out from the ID card or the like (a user ID etc.) is sent to the authentication processing unit 113*e*, where a determination is made as to whether the information matches the one registered as an authorized user. If the user is confirmed to be the authorized user, the process proceeds to Step 810. Meanwhile, if the user cannot be confirmed as the authorized user, the process returns to Step 803 where a message or the like that indicates an authentication error is displayed to prompt the user to make operation for a login again.

In Step 810, a list of print data (print job) for authentication printing instructed by the user who has been permitted to log in (a logged-in user) is obtained from the print data storage unit 113*d*, and is displayed on the LCD panel 111*a* (see the above-described authentication print screen 400 shown in FIG. 4).

In Step 811, a determination is made as to whether specific print data has been designated from the list of the print data (print job) and print start instruction has been performed. To be more specific, it is determined whether the specific print data (print job) to be a target for printing processing is selected by the logged-in user among the display of the list and whether a print start button 403 has been pressed. If the print start instruction has been given on the specific print data (print job), the process proceeds to Step 812. Meanwhile, if the print start instruction has not been given on the specific print data (print job), monitoring on the pressing of the print start button 403 continues. The execution of printing processing will be ensured by the print start instruction given by the logged-in user.

In Step 812, a determination is made as to whether a current power mode is either the first idle mode (operable)

or the second idle mode (printable). This determination can also be made depending on, for example, whether the anticipatory return setting is set to be enabled for the print engine. If the anticipatory return setting is set to be enabled for the print engine, the mode is recognized to be already transited to the second idle mode. As a result of the determination, if the current power mode is in the first idle mode, the process proceeds to Step 813, whereas if in the second idle mode, the process proceeds to Step 814.

In Step 813, a transition to the second idle mode from the first idle mode is instructed to the power control unit 114. Upon receiving the instruction, the power control unit 114 starts power supply to the printing unit 130. As a result, the imaging preparation processing is started in the printing unit 130.

In Step 814, the print data included in the print job instructed by the user to start printing is sequentially obtained in a page unit from the print data storage unit 113d.

In Step 815, in the print data analysis unit 113c, rendering processing which interprets PDL in the obtained print data to convert it into bitmap image data is executed in a page unit. Then, thus generated bitmap image data is sent to the printing unit 130.

In Step 816, in the printing unit 130, printing processing is executed to form an image on a sheet in accordance with the bitmap image data. Specifically, an image based on bitmap image data on the sheet fed from the sheet cassette 131 is formed through the processes of charging, exposing, developing, transferring, and fixing. Such an image-formed sheet (a printed material) is discharged onto the output tray 133. At this time, in a case where the anticipatory return setting itself is disabled or the print engine is not set to make the anticipatory return, printing processing will be started after the completion of the imaging preparation in the printing unit 130.

In Step 817, as for the print data (print job) instructed by the user to start printing, a determination is made as to whether the printing processing is completed for all pages. If there is any page in which the printing processing is not yet completed, the process returns to Step 814, followed by the rendering and printing processing on each page. Meanwhile, if the printing processing is completed for all the pages, the process proceeds to Step 818.

In Step 818, the power-saving mode transition processing which will be described later is executed and the power mode is transited to the power-saving mode. Thereafter, this processing ends.

[Transition-to-Power-Saving-Mode Processing]

Figure 9:
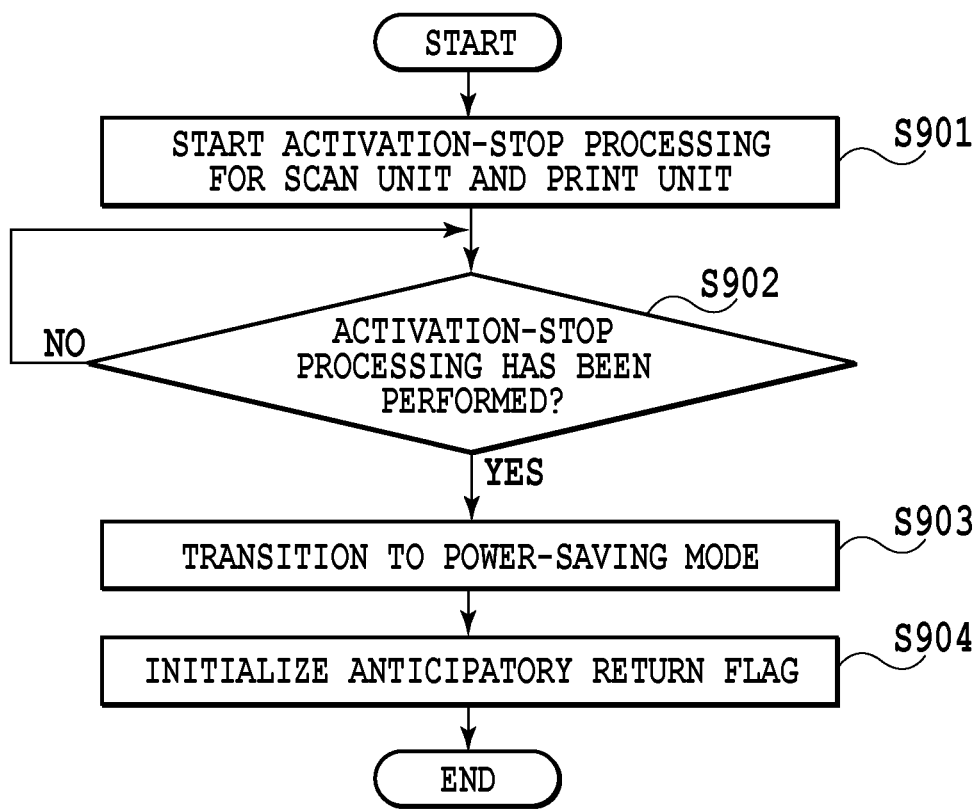
FIG. 9 is a flowchart showing a flow of power-saving mode transition processing.

Lastly, the power-saving mode transition processing will be described. FIG. 9 is a flowchart showing a flow of the power-saving mode transition processing. This processing is executed in, for example, the following cases:

(1) In a case where the power-saving button 155 is pressed under any one of the first to third idle modes;

(2) In a case where there has been no operation for a predetermined time period under any one of the first to third idle modes;

(3) In a case where the printing processing is completed under the fourth idle mode (S608: normal printing); and (4) In a case where the printing processing is completed under the second idle mode (S818: authentication printing).

In Step 901, notification to notify the scan unit 120 and the printing unit 130 of stopping power supply thereto is issued. As a result, processing to stop activation (e.g., processing for separating a component that requires physical separation and processing for cooling a heated component) is executed in the scan unit 120 and the printing unit 130, and then, at a stage where the processing is completed, such completion is notified to the CPU 113a.

In Step 902, a determination is made as to whether the notification on the completion of the activation-stop processing has been arrived. If the notification on the completion of the activation-stop processing has been arrived, the process proceeds to Step 903. Meanwhile, if such notification has not been arrived, the monitoring of the notification continues.

In Step 903, a transition to the power-saving mode is instructed to the power control unit 114. Upon receiving the instruction, the power control unit 114 stops power supply to each unit to which the power is supplied at the current state. As a result, the transition to the power-saving mode is completed.

In Step 904, the anticipatory return flag indicating presence/absence of the anticipatory return processing at the time of authentication printing is initialized, that is, the flag is set to be "OFF" which refers to non-execution.

The above is the details of the power-saving mode transition processing.

Here, an advantageous result of the present invention will be summarized below.

In the case of normal authentication printing, a user starts departing from the place of the PC 200 after instructing printing, and upon arrival at the place of the MFP 100, the MFP 100 is in a state where entire power supply to major modules within the apparatus is stopped (in the power-saving mode). The user then presses the power-saving button 115 to transit the MFP 100 to the idle mode, causing the input operation unit 111 and the authentication operation unit 112 to be powered on, the LCD panel 111a to be lit, and the MFP 100 to be in an available state.

In contrast, in high-speed authentication print control according to the present invention, by the time when the user arrives in front of the MFP 100 to perform a print start instruction, the LCD panel 111a in the input operation unit 111 is already lit and the login screen is displayed. Specifically, the user can, without pressing the power-saving button 115, immediately make operation for user authentication such as holding an ID card over the authentication operation unit 112. Accordingly, the user can, without experiencing the above-described "Start-Instruction WT," immediately refer to the list of the print data (print job) for the authentication printing requested by the user and can promptly perform the print start instruction with respect to the desired print data (print job). Furthermore, in a case where the anticipatory return for the printing unit 130 is set to be enabled, the imaging preparation processing by the print engine 132 is started before the user arrives at the place of the MFP 100, and thus, it is an advantage that the user does not have to wait in front of the MFP 100 for, at maximum, the period of time for accessing the place of the apparatus. For example, in a case where the imaging preparation processing requires 30 seconds and the period of time for accessing the place of the MFP 100 requires one minute, the imaging preparation processing is already completed at the time when the user arrives at the place of the MFP 100. In this case, if the user selects, without experiencing the above-described "Printing Start WT," the desired print data from the list of the print data (print job) for the authentication printing requested by the user to perform print start instruction, the printing processing will be started immediately.

As such, in the high-speed authentication print control according to the present invention, in the reception phase of the print data (print job), the input of authentication operation in the authentication operation unit 112 is allowed to be accepted and the anticipatory return processing including starting the imaging preparation by the print engine 132 is executed. Moreover, by executing the anticipatory return processing, waiting time for the user in front of the MFP can be reduced in a case, in particular, where the number of pages of the print data for authentication printing is small.

As described above, according to the present invention, in the case where authentication printing is instructed under the power-saving mode, waiting time until the completion of login authentication and waiting time until the completion of the imaging preparation by the print engine can be reduced. In addition, in the case where the user who has instructed the authentication printing does not pick up a printed material, wasteful consumption power can also be reduced by making control so as to set the mode back to the power-saving mode in a short time.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, user-waiting time can be reduced at the time of using functions for authentication printing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-172837, filed, Sep. 2, 2015, which is hereby incorporated by reference wherein in its entirety.

What is claimed is:

1. A printing apparatus comprising:
   a network interface configured to receive, from an external device, print data with an authentication attribute, wherein the print data with the authentication attribute received by the network interface is stored in the printing apparatus or an external apparatus and then printing using the print data is executed in accordance with a print instruction for the print data of an authenticated user;
   a storage configured to store the print data received by the network interface;
   an authentication unit configured to receive authentication information for authenticating a user;
   a user interface configured to accept, from an authenticated user, a print instruction for the print data of the authenticated user;
   a printer configured to print based on the stored print data in accordance with the print instruction accepted by the user interface;
   a setting unit configured to set whether to wake the printing apparatus from a power saving state in accordance with reception of the print data with the authentication attribute; and
   a power control unit configured to wake the printing apparatus from the power saving state in accordance with reception of the print data with the authentication attribute before the authentication unit receives the authentication information for authenticating a user based on a setting in the setting unit to wake the printing apparatus from the power saving state in accordance with reception of the print data with the authentication attribute.

2. The printing apparatus according to claim 1, wherein the power control unit supplies power to a display unit at the time of receiving the print data, or supplies power to the display unit at a predetermined timing after receiving the print data.

3. The printing apparatus according to claim 2, wherein the user interface further receives a timing condition, and
   the power control unit supplies power to the display unit at the timing accepted by the user interface, or supplies power to the display unit at a different timing after receiving the print data.

4. The printing apparatus according to claim 3, wherein the timing condition is any one of a time point where reception of the print data is completed, a time point where reception of the print data is started, or a predetermined time point before reception of the print data is completed.

5. The printing apparatus according to claim 1, wherein the user interface further receives a prohibit condition, and
   wherein the power control unit does not supply power to the display unit irrespective of the setting by the setting unit at a time of receiving print data satisfying the prohibit condition received by the user interface.

6. The printing apparatus according to claim 1, wherein the display unit displays a predetermined screen for setting whether to supply power to at least the display unit at the time of receiving the print data.

7. The printing apparatus according to claim 2, wherein the time of receiving the print data is a time of starting receiving the print data, a time of completing receiving the print data, or a time immediately before completing receiving the print data.

8. The printing apparatus according to claim 5, wherein the prohibit condition is a number of pages of the print data.

9. The printing apparatus according to claim 1, further comprising a sleep function of transiting a power mode to a power-saving mode after a lapse of a predetermined time period.

10. The printing apparatus according to claim 1, wherein a setting can determine whether to supply power to at least the printer at the time of receiving the print data.

11. The printing apparatus according to claim 10, wherein based on the settings, the power control unit supplies power to at least the display unit and the printer at the time of receiving the print data, supplies power to at least the display unit without supplying power to the printer at the time of receiving the print data, or supplies power to at least the display unit at a predetermined timing after receiving the print data.

12. The printing apparatus according to claim 1, wherein the print data is print data with an authentication attribute and requires a login to the printing apparatus for performing printing processing based on the print data.

13. The printing apparatus according to claim 1, wherein
the network interface is capable of receiving a different type of print data from the print data, and
the printer performs printing processing based on the different type of print data without the execution instruction.

14. The printing apparatus according to claim 13, wherein the power control unit does not supply power to the display unit at a time of receiving the different type of print data from the print data.

15. A method of controlling a printing apparatus, comprising the steps of:
receiving, from an external device, print data with an authentication attribute, wherein the print data with the authentication attribute is stored in the printing apparatus or an external apparatus and then printing using the print data is executed in accordance with a print instruction for the print data of an authenticated user;
receiving authentication information for authenticating a user;
accepting, from an authenticated user, a print instruction for the print data of the authenticated user;
printing based on the received print data in accordance with the print instruction;
setting whether to wake the printing apparatus from a power saving state in accordance with reception of the print data with authentication attribute; and
waking the printing apparatus from the power saving state in accordance with reception of the print data with the authentication attribute before the authentication unit receives the authentication information for authenticating a user based on a setting to wake the printing apparatus from the power saving state in accordance with reception of the print data with the authentication attribute.

16. The control method according to claim 15, further comprising the step of:
receiving a timing condition; and
supplying power to a display unit at the timing accepting the execution instruction, or supplying power to the display unit at a different timing after receiving the print data.

17. The control method according to claim 16, wherein the timing condition is any one of a time point where reception of the print data is completed, a time point where reception of the print data is started, or a predetermined time point before reception of the print data is completed.

18. The control method according to claim 15, further comprising the step of:
receiving a prohibit condition,
wherein power is not supplied to the display unit irrespective of the setting at a time of receiving print data satisfying the received prohibit condition.

19. The control method according to claim 15, further comprising the step of:
displaying a predetermined screen for setting whether to supply power to at least the display unit at the time of receiving the print data.

20. The control method according to claim 15, wherein the time of receiving the print data is a time of starting receiving the print data, a time of completing receiving the print data, or a time immediately before completing receiving the print data.

21. The control method according to claim 18, wherein the prohibit condition is a number of pages of the print data.

22. The control method according to claim 15, further comprising a sleep function step of transiting a power mode to a power-saving mode after a lapse of a predetermined time period.

23. The control method according to claim 15, further comprising a step of setting whether to supply power to at least a printer of the printing apparatus at the time of receiving the print data.

24. The control method according to claim 23, wherein based on the settings, further comprising the steps of supplying power to at least the display unit and the printer at the time of receiving the print data, supplying power to at least the display unit without supplying power to the printer at the time of receiving the print data, or supplying power to at least the display unit at a predetermined timing after receiving the print data.

25. The control method according to claim 15, wherein the print data is print data with an authentication attribute and requires a login to the printing apparatus for performing printing processing based on the print data.

26. The control method according to claim 15, wherein
a different type of print data can be received from the print data, and
printing processing is performed based on the different type of print data without the execution instruction.

27. The control method according to claim 26, wherein power is not supplied to the display unit at a time of receiving the different type of print data from the print data.

* * * * *